(12) United States Patent
Riemensperger et al.

(10) Patent No.: US 12,204,310 B2
(45) Date of Patent: Jan. 21, 2025

(54) PRODUCTION SYSTEM FOR PROCESSING WORKPIECES

(71) Applicant: Festo SE & Co. KG, Esslingen (DE)

(72) Inventors: Ralf Riemensperger, Esslingen (DE); Timo Höhl, Esslingen (DE)

(73) Assignee: Festo SE & Co. KG, Esslingen (DE)

( * ) Notice: Subject to any disclaimer, the term of this patent is extended or adjusted under 35 U.S.C. 154(b) by 232 days.

(21) Appl. No.: 17/887,719

(22) Filed: Aug. 15, 2022

(65) Prior Publication Data

US 2023/0053810 A1 Feb. 23, 2023

(30) Foreign Application Priority Data

Aug. 17, 2021 (DE) ...................... 10 2021 209 011.7

(51) Int. Cl.
| | | |
|---|---|---|
| *G05B 19/00* | (2006.01) | |
| *G05B 19/4061* | (2006.01) | |
| *G05B 19/418* | (2006.01) | |

(52) U.S. Cl.
CPC ... *G05B 19/4061* (2013.01); *G05B 19/41815* (2013.01); *G05B 19/4183* (2013.01); *G05B 19/4185* (2013.01); *G05B 2219/14116* (2013.01)

(58) Field of Classification Search
None
See application file for complete search history.

(56) References Cited

U.S. PATENT DOCUMENTS

| | | | | |
|---|---|---|---|---|
| 9,573,229 | B2 * | 2/2017 | Li .......................... | B23P 19/001 |
| 2008/0274865 | A1 * | 11/2008 | Sturm .................... | B23P 19/001 |
| | | | | 29/564 |
| 2009/0012642 | A1 * | 1/2009 | Mertens ............... | B23Q 7/1405 |
| | | | | 700/112 |
| 2014/0046477 | A1 * | 2/2014 | Brahan ................ | G05B 13/024 |
| | | | | 700/170 |
| 2014/0067109 | A1 * | 3/2014 | Kawai ................ | B23Q 17/2428 |
| | | | | 700/112 |
| 2017/0297155 | A1 * | 10/2017 | Podiebrad .............. | B23Q 1/017 |
| 2017/0320181 | A1 * | 11/2017 | Lee ....................... | G05B 19/401 |

(Continued)

FOREIGN PATENT DOCUMENTS

| | | |
|---|---|---|
| DE | 103 35 570 A1 | 2/2005 |
| DE | 20 2005 015 118 U1 | 3/2007 |

(Continued)

*Primary Examiner* — Truc M Do

(74) *Attorney, Agent, or Firm* — Hoffmann & Baron, LLP

(57) ABSTRACT

Production system for processing workpieces, having a robot module, a workpiece carrier module and a machining module, all of them being working modules, wherein each of said working modules includes an interface surface, the interface surface having a supply interface and a communication interface, wherein the robot module includes a robot and a robot controller for handling workpieces, wherein the workpiece carrier module includes a plurality of workpiece locations for receiving unmachined and finished workpieces, wherein the machining module includes a processing system for carrying out at least one processing operation on at least one workpiece; wherein a data carrier is assigned to each of the working modules, which a data carrier stores processing data, the processing data including a transfer position for workpieces and being coded for processing in the robot controller of the robot module.

9 Claims, 1 Drawing Sheet

(56) References Cited

U.S. PATENT DOCUMENTS

2018/0222047 A1\* 8/2018 Nishi .................. G05D 1/0088
2021/0208568 A1\* 7/2021 Krause .................. B33Y 50/02

FOREIGN PATENT DOCUMENTS

DE   10 2018 000 627 A1   8/2018
DE   10 2019 214 088 A1   3/2021
WO      2014/160738 A2   10/2014

\* cited by examiner

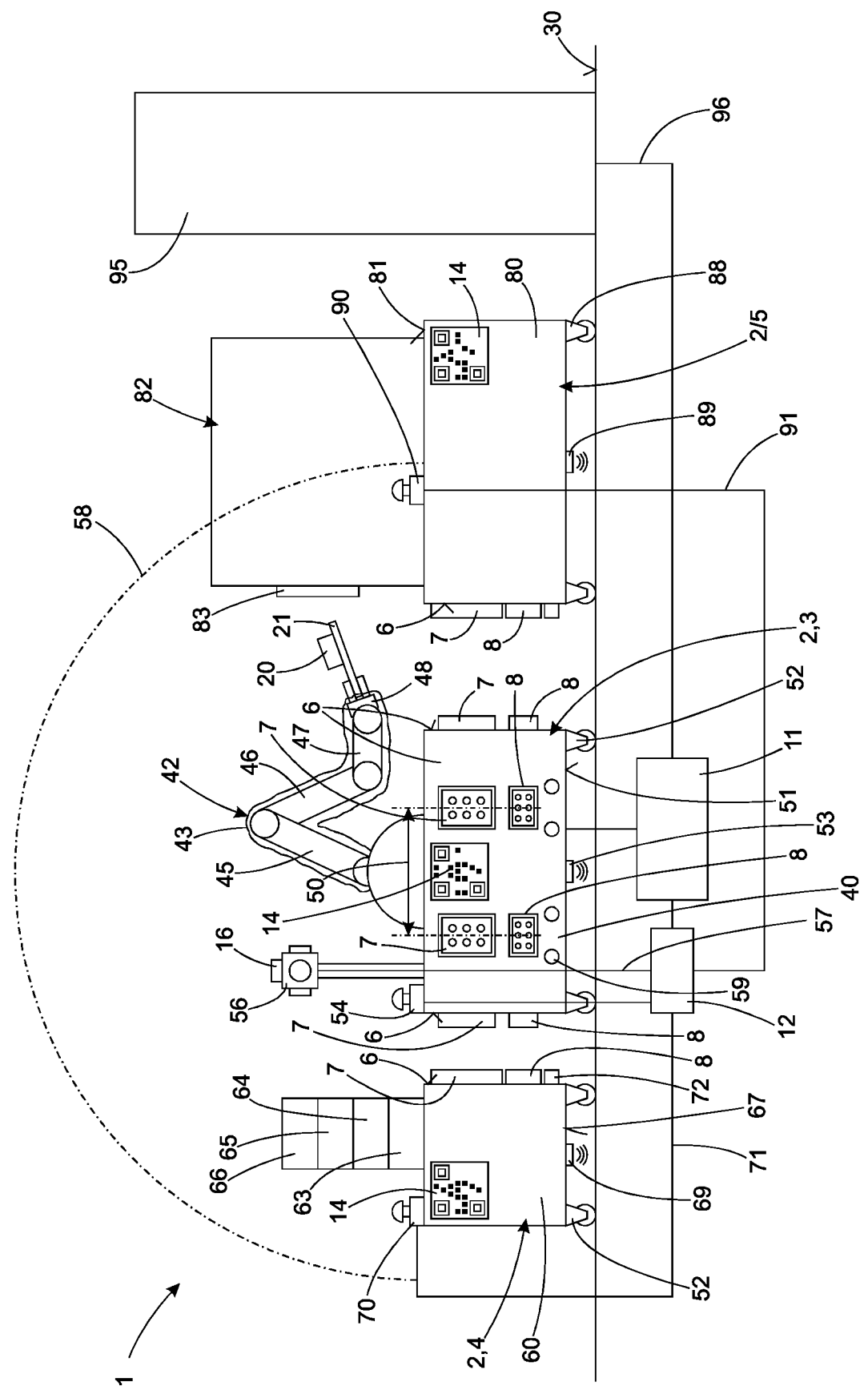

PRODUCTION SYSTEM FOR PROCESSING WORKPIECES

BACKGROUND OF THE INVENTION

The invention relates to a production system for machining workpieces.

The task of the invention is to provide a production system with which a flexible adaptation of a machining process to be carried out with the production system to different products can be ensured.

SUMMARY OF THE INVENTION

This task is solved for a production system as mentioned above with a production system comprising at least one working module from the group: robot module, workpiece carrier module, machining module, wherein each working module comprises, at an interface surface, a supply interface and a communication interface for coupling with a further working module, wherein the robot module comprises a robot and a robot controller and is designed for handling workpieces, wherein the workpiece carrier module has a plurality of workpiece locations for receiving unmachined and finished workpieces, wherein the machining module comprises a processing system for carrying out at least one processing operation on at least one workpiece, wherein each working module is assigned a data carrier which is designed for storing and providing processing data, wherein the processing data comprise a transfer position for workpieces and are coded for processing in the robot controller of the robot module.

As a minimum configuration the production system comprises at least one robot module and at least one workpiece carrier module and at least one machining module.

In order to ensure simple and efficient coupling of different working modules, it is provided that each working module is equipped with a supply interface and a communication interface at least on one interface surface. The supply interface is used to feed energy into the respective working module and/or to forward energy that is available at the respective working module to other working modules. This energy is in particular electrical energy and/or pneumatic energy. The communication interface is used to feed communication signals into the respective working module and/or to provide or forward communication signals to another working module. By way of example, the communication interface can be designed as a bus interface with which it is possible to receive signals from a field bus system and to forward signals by means of the field bus system.

In particular, the interface surface can be designed as a side surface of the respective working module so that working modules arranged adjacent to each other and intended for coupling can be connected side by side to each other by a linear approach movement. Preferably, the interface surfaces are aligned vertically so that working modules arranged on a substantially flat hall floor of a production hall can be approached to each other by horizontal movements and the respective interfaces, i.e. the supply interface and the communication interface, are coupled to each other in the process. Preferably, both the supply interface and the communication interface are designed as connectors, so that both coupling and decoupling of the respective interface can be achieved solely by an exemplary linear approach movement or removal movement between adjacent working modules. Where appropriate, the supply interface and the communication interface are implemented in a common connector.

The task of the robot module, which may be equipped with a multi-axis industrial robot, for example, is to enable flexible handling of workpieces. For this purpose, a robot arm of the multi-axis industrial robot is provided with a gripper at an end region, which end region is also referred to as a hand axis. The gripper is designed to remove workpieces or workpiece carriers provided with workpieces from the workpiece carrier module and feed them to the machining module, or to remove workpieces from the processing module and feed them to the workpiece carrier module.

The workpiece carrier module may, for example, be provided with a shelf in which a plurality of compartments are formed, also referred to as workpiece locations, each of which is suitable for receiving a workpiece or a workpiece carrier provided with a workpiece. Further, it may be provided that the workpiece carrier module is configured for conditioning workpieces, for example, for tempering the workpieces to maintain them at a particular temperature or to impose a particular temperature profile either prior to machining in the machining module and/or after machining in the machining module.

The machining module can comprise one or more processing systems, each of which is designed for workpiece processing. By way of example, a processing system is designed for additive or subtractive surface machining of a workpiece, in particular as a 3D printer or milling device or laser machining device. If the machining module comprises several processing systems, these can be designed for sequential processing of the respective workpiece. Alternatively, it can also be provided that parallel processing of workpieces is carried out in the processing systems of the machining module, whereby the workpieces processed in the individual processing systems are forwarded to other processing modules, if necessary, to carry out intermediate steps and are only fed back to the corresponding processing module for the next processing step at a later time.

Each of the working modules is assigned a data carrier which is designed to store and provide working data, the working data comprising at least one transfer position for workpieces and being coded for processing in the robot controller of the robot module. This is based on the consideration that the handling of workpieces or of workpiece carriers provided with workpieces requires, for example, information about the spatial position at which a transfer of the workpiece to the workpiece carrier module or the machining module is to be carried out. For example, a workpiece is to be fed to a processing system at a feed position and is to be discharged from the processing system at a discharge position that differs from the feed position.

Since this information is individual for the respective working module, but is generally not subject to change, it is advantageous if this information is stored in a set of working data and, when the respective working module is coupled, provision of this working data to neighboring working modules, in particular to the robot module, can be made. By storing and providing the work data at or in the respective working module, a flexible and fast coupling of this working module with other working modules is supported. Furthermore, it is advantageous if the work data are coded in a manner that enables direct processing in a robot controller of the robot module.

Advantageous further embodiments of the invention are the subject of the subclaims.

It is expedient if at least one working module, in particular the robot module, has a plurality of interface surfaces and is designed for coupling with a plurality of working modules.

Preferably, the interface surfaces are each designed to be flat and are particularly preferably aligned in the vertical direction. By way of example, it can be provided that a plurality of arrangements of supply interfaces and communication interfaces are arranged on an interface surface; these are then preferably arranged in a fixedly predetermined pitch with respect to one another. This enables several working modules to be coupled to a single interface surface of the working module equipped accordingly. Preferably, it is provided that the robot module has interface surfaces on a plurality of side surfaces in each case, which may optionally also have a plurality of arrangements of supply interfaces and communication interfaces.

Preferably, it is provided that the robot controller comprises a safety controller that is electrically connected to a plurality of sensors arranged on the robot and that is configured to process sensor signals from the sensors to ensure hazard-free cooperation of the robot with a user. The safety controller may be formed as an integral part of the robot controller and include, for example, specific software programmed to ensure a predetermined level of safety. Alternatively, the safety controller can be designed to be structurally separate from the robot controller and can ensure data processing that is completely independent of the robot controller, in particular redundant. The task of the safety controller is to safeguard movements of the industrial robot and movements of a human worker, i.e. an operator or worker who is in a spatial volume that can be swept by the industrial robot, in such a way that no danger to the human worker occurs. Preferably, the sensors and the safety controller are coordinated with each other in such a way that collaborative cooperation between the human worker and the industrial robot can be ensured. By way of example, the sensors are designed to detect contact between the human worker and the industrial robot and/or to detect distances between the human worker and the industrial robot. The task of the safety controller is to influence an energy supply for the industrial robot of the robot module as a function of sensor signals which are provided by the sensors, in order to be able to either shut down the robot in any hazardous situations or at least move it into a hazard-free position. Exemplarily, it can be provided that the work data of the working modules also contain information regarding the geometries of the respective working module in order to thereby enable the robot controller to determine collision zones that must be avoided during the movement of the industrial robot.

In a further development of the invention, it is provided that each working module has an locking system, in particular associated with the interface surface, which is designed for a force-transmitting lock with an adjacently arranged working module and which is designed for an automated coupling of the supply interface and the communication interface with a supply interface and a communication interface of an adjacently arranged working module. The locking system can optionally be designed for manual operation by a user or for power-operated operation and is used for mechanical coupling of adjacent working modules. In the course of this mechanical coupling when the locking interface is locked, the oppositely arranged supply interfaces and communication interfaces of adjacent working modules are also coupled to one another, so that the coupling process also ensures the provision and/or forwarding of power and/or communication signals between the working modules.

Preferably, the locking systems of adjacently arranged working modules are designed for a precise spatial alignment of the working modules with respect to each other and for this purpose comprise, for example, suitable centering means, in particular centering holes arranged on the interface surfaces and centering pins arranged on opposite interface surfaces and adapted to the centering holes.

In a further embodiment of the invention, it is provided that at least one of the working modules is designed with a movement system from the group: wheels with drive device, skids with stepping device, sliding surfaces with lifting device, chains with drive device, and is designed for a relative movement with respect to at least one further working module. This allows the correspondingly designed working modules to be moved automatically without the intervention of an operator and, for example, to control an intended interface of an adjacent working module in order to couple there for a subsequent processing operation of workpieces.

It is advantageous if the working module, which is provided with the movement system has a reading device for contact or contactless reading of the data carrier of an adjacent working module as well as a processing system for processing the work data and for controlling the movement system. This enables the working module equipped with the movement system, on the basis of a processing task provided to this working module, to control a further working module suitable for carrying out this processing task and to connect automatically to this working module in order to be able to carry out at least one partial step of the set working task. The reading device can be designed in particular as an optical reader and/or as an RFID reader, which can read without contact an optically readable label or RFID tag arranged on the adjacent working module, in which working data of the working module equipped therewith are stored. After the read-out process has been carried out, the working module equipped with the reading device processes the work data. Subsequently, the working module equipped with the reading device can either signal a readiness for coupling with the adjacently arranged working module in order to indicate to an operator that a coupling process can be performed with this working module. Alternatively, the working module may perform an automated coupling with the adjacent working module using the movement system.

In an advantageous further development of the invention, it is provided that each of the working modules is equipped with an emergency stop switch and that the communication interface is designed for a safety-oriented forwarding of an emergency stop signal upon actuation of the emergency stop switch to at least one adjacently arranged working module, preferably to a predetermined group of interconnected working modules, in particular to all interconnected working modules. With the actuation of the emergency stop switch, a handling or machining process can be terminated at the working module whose emergency stop switch has been actuated. Furthermore, it can be provided that the safety signal triggered by the actuation of the emergency stop switch is forwarded to adjacent working modules via the communication interface. In this case, the communication interfaces and the communication controllers of the interconnected working modules assigned to the communication interfaces are aligned with each other in such a way that the safety signal is forwarded to the safety controller with a high priority, in particular with the highest priority, in order to trigger a suitable action for the production system there. This action can either consist of a complete and immediate shutdown of the entire production system, or alternatively it can be provided that only those processes in the production system are brought into a hazard-free state which actually pose a potential hazard. By way of example, it can be provided that the work data of a respective working module also contain information about the manner in which this working module can be reliably brought into a safe state, so that when the production system is set up by coupling a number of working modules, corresponding information can be provided to the safety controller and the latter can schedule different reaction patterns for different hazard situations.

In a further embodiment of the invention, it is provided that a higher-level controller is connected to at least one working module, in particular to the robot module, and that a plurality of data sets for different processing operations are stored in the higher-level controller, each data set comprising a layout plan for a geometric arrangement of working modules and parameters for parameterizing the working modules. By way of example, the higher-level control system belongs to a so-called control level in which information can be exchanged between a large number of production systems and no specific control commands for individual processing systems or actuators are generated and transmitted. Rather, it is the task of the higher-level control, which can be designed in particular as a programmable logic controller, to provide data records with which an at least partially automated combination of production systems can be carried out. For example, the higher-level controller provides such a data set to the robot module and the robot module then addresses one or more working modules, in particular contactlessly, in order to query their suitability and availability for the processing operation contained in the data set. Furthermore, the data set still contains a site plan with information about a spatial arrangement of the working modules, in particular with respect to the robot module that often serves as the central working module. In addition, the data set may also include parameters for the operation of one or more of the working modules used to perform the machining operation, and these parameters may also include a plurality of working steps, such as those that must be performed sequentially by a working module configured as a milling machine to machine a corresponding workpiece. Accordingly, the robot module can be designed to make the parameters contained in data set available to the working modules to be connected, whereby the communication required for this between the working modules can be carried out in a so-called field level.

It is expedient if the working module comprises a position module that is designed for determining a spatial position of the working module and for wireless provision of a position signal as well as for receiving and processing position signals of further working modules. With the respectively assigned position module, the working module is enabled to determine its own spatial position and to provide it wirelessly as a position signal. For example, the position module is set up to use position markings that are embedded in the floor of a production hall or are formed on the surface of the hall floor, thus enabling it to determine its own position. Alternatively, the position module can also be designed as a GPS module that uses either a satellite-based and/or a telephone network-based and/or an individually arranged position determination system in the respective production hall.

BRIEF DESCRIPTION OF THE DRAWINGS

An advantageous embodiment of the invention is shown in the drawing. Hereby shows:

FIG. 1 a strictly schematic representation of a production system with a robot module, a workpiece carrier module and a machining module.

DETAILED DESCRIPTION

A production system 1 shown in FIG. 1 comprises, purely by way of example, a total of three working modules 2 and is designed for machining workpieces 20, which, purely by way of example, are each fixed on workpiece carriers 21 of plate-like design. By way of example, the production system 1 is arranged in a production hall not shown in greater detail, the working modules 2 being set up on a hall floor 30 of purely exemplary flat design.

According to the representation of FIG. 1, the production system 1 includes a robot module 3, a workpiece carrier module 4 and a machining module 5 as working modules 2. In order to carry out a machining operation, the working modules 2 are arranged directly adjacent to one another, in deviation from the purely schematic and non-scale representation of FIG. 1, and are connected to one another in the manner described in more detail below, both mechanically and with regard to energy flows and communication links.

The robot module 3 comprises a cuboid-shaped base body 40, which encloses a spatial volume not shown in more detail, in which all the components required for the operation of a multi-link robot arm 42 arranged on an upper side 41 of the base body 40 are accommodated. To simplify the illustration, in FIG. 1 the components of significance for the following description of the production system 1, namely the robot controller 11 and the safety controller 12, are arranged outside the base body 40. In practice, however, these components are located inside the base body 40. The robot arm 42 may have electrical actuators for relative movement of the individual arm members 45 to 48. Alternatively, the robot arm 42 may have pneumatic actuators for relative movement of the individual arm members 45 to 48.

In either case, the robot controller 11 is adapted to suitably control the actuators so as to enable coordinated movement of the individual arm members 45 to 48. The arm member 48 arranged at the end of the robot arm 42 is also referred to as the hand axis and carries a gripper 49 which is set up for gripping the plate-shaped workpiece carrier 21.

Purely by way of example, the robot arm 42 is provided with a touch sensor 43 of tubular design which is electrically connected to the safety controller 12 via an electric sensor line and which provides a safety-oriented signal to the safety controller 12 in the event of contact with an object or a user. By way of example, it can be provided that the safety controller 12 can act on the robot controller 11 when the safety-oriented signal arrives. Preferably the safety controller 12 acts in such a way that the robot controller 11 performs an immediate immobilization of the robot arm 42 or, if necessary, a retraction movement for the robot arm 42.

As can be seen from the illustration in FIG. 1, a plurality of flat interface surfaces 6 are formed on the base body 40 of the robot module 3, each aligned in the vertical direction in a purely exemplary manner, which flat interface surfaces 6 are equipped with at least one supply interface 7 and one communication interface 8, respectively. Purely by way of example, the interface surface 6 facing the viewer of FIG. 1 is provided with two supply interfaces 7 and two communication interfaces 8, respectively, which are spaced apart from one another at a predetermined spatial pitch 50. Exemplarily, the supply interfaces 7 and the communication interfaces 8 of the robot module 3 are designed as electromechanical plugs which, in the case of the supply interface 7, are designed for providing electrical power to further working modules 2 and, in the case of the communication interface 8, are designed for providing communication signals to further working modules 2.

Furthermore, purely by way of example, a data carrier 14 is arranged on each of the interface surfaces 6, which is designed, by way of example, as a combination of an optically readable coding and a wirelessly readable RFID label. Exemplarily, it may be provided that working data serving to characterize properties of the respective working module 2 are stored both in the optically readable coding and in the RFID label, respectively. Alternatively, it may also be provided that the optically readable coding merely represents an individual identifier of the respective working module 2 and the working data of the working module 2 are stored in the RFID tag.

Wheels 52 are arranged on an underside 51 of the base body 40, which are steerable and drivable and form a movement system, so that the robot module 3 can assume a desired position on the hall floor 30 in a self-propelled manner A position module 53 is arranged on the underside 51 for determining this position and for comparing this position with positions of other working modules 2. Purely by way of example, the position module 53 is designed for wireless position determination and for this position determination can, for example, refer to a position grid arranged on or in the hall floor 30, which is not shown and with which precise position determination within the production hall is made possible. Since the robot module 3 very often forms the central working module 2 of a production system 1 and may not need to be moved, it may also be possible to dispense with equipping it with the wheels 52.

Furthermore, the robot module 3 is equipped with an emergency stop switch 54, which is arranged, purely by way of example, on the upper side 41 of the base body 40 and which is connected to the safety controller 12 via an electric emergency stop line 55. This ensures that an emergency stop signal triggered by actuation of the emergency stop switch 54 by a user is transmitted directly to the safety control 12. Alternatively, it can also be provided that the emergency stop switch 54 is suitably connected to an internal communication system of the robot module 3, which internal communication system is designed for a prioritized transmission of emergency stop signals to the safety control 12.

Furthermore, a camera module 56 is arranged on the upper side 41 of the base body 40, which is connected to the safety controller 12 via an electric sensor line 57 and which comprises one or more cameras, not shown in more detail, with which a purely exemplary hemispherical spatial movement volume 58, shown only schematically, in which the robot arm 42 can be moved, can be completely detected. The task of the camera module 56 is to monitor the spatial movement volume 58 and, by using image processing formed in the camera module 56 in a purely exemplary manner, to enable a statement to be made as to whether objects and/or human workers are located in the spatial movement volume 58 which could be endangered by movements of the robot arm 42. If this is the case, the image processing of the camera module 56 is designed to provide a corresponding sensor signal via the electric sensor line 57 to the safety controller 12, which brings about a suitable reaction for the further operation of the production system 1 as a function of an information content of the sensor signal.

By way of example, it is provided that the robot module 3 has a reader module 16 which is connected to the robot controller 11 and is mounted on the camera module 56 in a purely exemplary manner. The reader module 16 is designed to read both the optical information from data carriers 14 and the electromagnetically retrievable information from the data carriers 14 and to forward it to the robot controller 11 in order to be able to perform an evaluation of stored work data there. In addition or alternatively, a reader, which is not shown and is coupled to the robot controller 11 by cable or wirelessly, can also be provided, with which a user can carry out an acquisition of the data carriers 14 from working modules 2 arranged in the vicinity.

The workpiece carrier module 4 arranged adjacent to the robot module 3 comprises, purely by way of example, a cuboid-shaped base body 60, on the upper side 61 of which a shelf 62 with, purely by way of example, four workpiece locations 63 to 66 is arranged. Each of the workpiece locations 63 to 66 is designed to accommodate a workpiece carrier 21 with a workpiece 20 mounted thereon. A number of wheels 68 are arranged on an underside 67 of the base body 60 in the same way as in the robot module 3, each of which can be steered and driven and form a movement system so that the workpiece carrier module 4 can also independently move to a desired position within the production hall. For this purpose, the workpiece carrier module 4 is equipped with a position module 69 in the same way as the robot module 3. Furthermore, the upper side 61 of the base body 60 carries an emergency stop switch 70, which is directly connected to the safety control 12 in the same way as the emergency stop switch 54 via an associated electric emergency stop line 71.

By way of example, it is provided that the workpiece carrier module 4 has only a single interface surface 6, on which a supply interface 7 designed as an electromechanical socket and a communication interface 8 designed as an electromechanical socket are arranged. Purely by way of example, it is provided that the data carrier 14 is arranged on a side surface of the base body 70 arranged adjacent to the interface surface 6, which data carrier 14 is technically designed in the same way as the data carrier 14 of the robot module 3, but contains work data of the workpiece carrier module 4 deviating from the work data of the robot module 3. Exemplarily, the work data of the workpiece carrier module 4 includes information about the spatial positioning of the workpiece locations 73 to 76. Thus, when this work data is transmitted to the robot controller 11 of the robot module 3, the necessary information can be provided to the robot controller 11 with which the robot arm 42 can be controlled for feeding or discharging a respective workpiece carrier 21 to a workpiece location 73 to 76 and/or from a workpiece location 73 to 76. In the practical implementation of the workpiece carrier module 4, provision can be made to arrange the data carrier 14 at the interface surface 6.

Below the communication interface 8, two latch bolts 72 projecting in the direction of the robot module 2 are formed on the interface surface 6 of the workpiece carrier module 4 as shown in FIG. 1, which are provided for engagement in corresponding latch recesses 59 in the base body 40 of the robot module 3 to form a locking system 9. Here, it is provided that corresponding latch recesses 59 are associated with each of the interface surfaces 6 of the robot module 3. The latch bolts 72 are designed for a mechanical locking of the workpiece carrier module 4 to the robot module 3, which can preferably be carried out automatically. Preferably, the locking bolts 72, which are not shown in more detail, and the locking recesses 59, which are also not shown in more detail, are adapted to one another in such a way that the plug-in connections of the supply interface 7 and the communication interface 8 between the robot module 3 and the workpiece carrier module 4 are also connected automatically in the course of a locking process.

By way of example, it is provided that the machining module 5 also has a cuboid base body 80 which, in the same way as in the case of the workpiece carrier module 4, has, on an interface surface 6 facing the robot module 3 as shown in FIG. 1, a supply interface 7, a communication interface 8 and locking pins 92 which are provided in the same way as in the case of the workpiece carrier module 4 for engagement in the locking recesses 59 in the base body 40 of the robot module 3.

On an upper side 81 of the base body 80, a purely exemplary cuboid-shaped machining cell 82 is arranged, in which a processing system is accommodated. The processing system can be, for example, a milling machine or a laser marking device or a 3-D printer.

For a supply of workpiece carriers 21 with workpieces 20 mounted thereon and for a removal of workpiece carriers 21 with workpieces 20, the machining cell 82 has a transfer shaft 83 which is open in the direction of the robot module 3 and may be closed with a flap. The work data stored on the data carrier 14 of the machining module 5 contain, for example, information about the spatial arrangement and/or orientation and/or geometric dimensions of the transfer shaft 83 and, if necessary, still information about a transfer position for the workpiece carrier 21 in the processing cell 82.

On an underside 87 of the base body 80 of the machining module 5, a plurality of wheels 88 are arranged in the same way as in the robot module 3, each of which is steerable and drivable and forms a movement system, so that the processing module 5 can also independently control a desired position within the production hall. For this purpose, the machining module 5 is equipped with a position module 89 in the same way as the robot module 3. Furthermore, the upper side 81 of the base body 80 carries an emergency stop switch 90, which is directly connected to the safety control 12 in the same way as the emergency stop switch 54 via an associated electric emergency stop line 91.

A mode of operation for the production system 1 can be described as follows:

In a first step, a data set in which a specific processing operation is stored is transmitted to the robot controller 11 from a higher-level controller 95, which may be designed as a PLC, for example, via an electric communication line which is designed as a data bus line 96 in a purely exemplary manner. Furthermore, the data set comprises a location plan for the required functions of working modules as well as for a spatial arrangement of the working modules 2 for carrying out the machining operation. Furthermore, the data set also comprises some parameters for the parameterization of the working modules 2 necessary for the execution of the machining operation.

In the robot controller 11, an identification of the working modules 2 required for the machining process takes place and subsequently the robot module 3 establishes a communication link, for example via Bluetooth or WLAN, with working modules 2 in the vicinity and first queries which of these working modules 2 is not currently integrated in another machining process. Furthermore, the robot module 3 queries the respective range of functions of the available working modules 2. Provided that the robot controller 11 has been able to determine on the basis of the determined results that the working modules 2 required to carry out the intended machining process are available, the required working modules can be requested by the robot controller 11 via the communication link to move automatically and autonomously in the direction of the robot module 3 and to couple there to suitable interface areas 6, whereby the information from the position plan can be used for this purpose.

With the coupling of the individual working modules 2 to the robot module 3, the coupling between the respective supply interfaces 7 and the communication interfaces 8 of the working modules 2 also takes place automatically, so that a functional overall network of working modules 2 is now created, which forms the production system 1.

In a subsequent step, the work data stored in the respective data carriers 14 of the working modules 2 is read out by means of the reader 16 and the work data is transmitted to the robot controller 11. On the basis of the read-out work data of the working modules 2, the individual working modules 2 are then parameterized by the robot controller 11 as a function of the machining operation to be performed. For this purpose, parameters from the data set provided by the higher-level controller 95 as well as parameters from the work data of the individual working modules 2 are used.

Subsequently, the machining process can be started, whereby it is provided for this purpose that the robot arm 42 picks up, for example, from one of the workpiece locations 63 to 66, a workpiece carrier 21 with workpiece 20 mounted thereon and therefore takes into account the respective removal position contained in the work data of the workpiece carrier module 4. In the course of a spatial movement, the robot arm 42 feeds the workpiece carrier 21 to the transfer shaft 83 of the machining module 5, so that the latter can carry out the desired machining after providing the workpiece 20 on the workpiece carrier 21. For example, this machining is a cutting operation such as a milling operation. After completion of the machining operation, the machining module 5 can provide a corresponding signal to the robot controller 11 via the communication interface 8, which then causes a movement of the robot arm 42 so that the pick-up of the machined workpiece 20, in particular on the associated workpiece carrier 21, can be carried out.

What is claimed is:

1. A production system for processing workpieces having the following working modules: a robot module, a workpiece carrier module and a machining module, wherein each of said working modules comprises an interface surface, the interface surface having a supply interface and a communication interface, wherein the robot module comprises a robot and a robot controller for handling workpieces, wherein the workpiece carrier module comprises a plurality of workpiece locations for receiving unmachined and finished workpieces, wherein the machining module comprises a processing system for carrying out at least one processing operation on at least one workpiece, and wherein a data carrier is assigned to each of the working modules, which data carrier stores processing data, the processing data comprising a transfer position for workpieces and being coded for processing in the robot controller of the robot module, and wherein at least one of the working modules comprises a movement system from the group: wheels with drive device, skids with stepping device, sliding surfaces with lifting device, chains with drive device, for a relative movement with respect to at least one further working module, and wherein each working module provided with the movement system has a reading device for a contact bound reading or a contactless reading of the data carrier of the adjacently arranged working module and a processing system for processing the working data and for controlling the movement system.

2. The production system according to claim 1, wherein at least one of said working modules has a plurality of said interface surfaces to allow a coupling of said working module with to a plurality of other working modules.

3. The production system according to claim 1, wherein the robot controller comprises a safety controller and a plurality of sensors arranged on the robot, wherein the safety controller is electrically connected with the plurality of sensors and processes sensor signals of the sensors in order to ensure a hazard-free cooperation of the robot with a user.

4. The production system according to claim 1, wherein each working module has a locking system for a force-transmitting locking with an adjacently arranged working module to provide an automated coupling of the supply interface and the communication interface of the respective working module with the supply interface and the communication interface of the adjacently arranged working module.

5. The production system according to claim 1, wherein each of the working modules is equipped with an emergency stop switch and wherein the communication interface provides a safety-oriented forwarding of an emergency stop signal upon actuation of the emergency stop switch to at least one adjacently arranged working module.

6. The production system according to claim 5, wherein the communication interface provides the safety-oriented forwarding of the emergency stop signal to a predetermined group of interconnected working modules.

7. The production system according to claim 5, wherein the communication interface provides the safety-oriented forwarding of the emergency stop signal to all connected working modules.

8. The production system according to claim 1, wherein a higher-level controller is connected to at least one working module and wherein a plurality of data sets for different processing operations are stored in the higher-level controller, each data set comprising a layout plan for an arrangement of working modules and parameters for the parameterization of the working modules.

9. The production system according to claim 1, wherein the working module comprises a position module which is designed for determining a spatial position of the working module and for wireless provision of a position signal and for receiving and processing position signals of further working modules.

* * * * *